United States Patent [19]

Takemura et al.

[11] Patent Number: 5,024,309
[45] Date of Patent: Jun. 18, 1991

[54] ROTATIONAL SPEED DIFFERENTIAL RESPONSIVE TYPE CONTROL COUPLING

[75] Inventors: Toji Takemura, Yokohama; Takashi Okubo, Yokosuka, both of Japan

[73] Assignee: Nissan Motor Co., Ltd., Yokohama, Japan

[21] Appl. No.: 409,669

[22] Filed: Sep. 20, 1989

[30] Foreign Application Priority Data

Sep. 20, 1988 [JP] Japan .................. 63-123105[U]
Sep. 29, 1988 [JP] Japan ...................... 63-245232

[51] Int. Cl.⁵ .............................. F16D 31/02
[52] U.S. Cl. ..................... 192/60; 192/82 T
[58] Field of Search ................... 192/60, 82 T

[56] References Cited

U.S. PATENT DOCUMENTS

| | | | |
|---|---|---|---|
| 1,105,792 | 8/1914 | Jessen | 192/60 |
| 1,436,753 | 11/1922 | Carpenter | 192/60 |
| 1,880,748 | 9/1932 | Bower | 192/60 |
| 2,595,479 | 5/1952 | Nelson | 192/60 |
| 2,726,557 | 12/1955 | Ackerman | 192/82 T |
| 3,923,113 | 12/1975 | Pagdin | 192/82 T |
| 4,518,069 | 5/1985 | Elias | 192/60 |
| 4,762,213 | 8/1988 | Watanabe | 192/82 T |
| 4,829,769 | 5/1989 | Hiramatsu | 192/60 |
| 4,921,085 | 5/1990 | Takemura et al. | 192/60 |
| 4,932,510 | 6/1990 | Takemura et al. | 192/60 |
| 4,958,711 | 9/1990 | Okubo et al. | 192/82 T |

FOREIGN PATENT DOCUMENTS

| | | |
|---|---|---|
| 0310962 | 4/1989 | European Pat. Off. . |
| 3432846 | 3/1985 | Fed. Rep. of Germany . |
| 3816632 | 12/1988 | Fed. Rep. of Germany . |
| 0473755 | 1/1915 | France . |
| 62-286838 | 12/1987 | Japan . |
| 63-62635 | 4/1988 | Japan . |
| 63-62636 | 4/1988 | Japan . |
| 419294 | 11/1934 | United Kingdom ............ 192/60 |

*Primary Examiner*—Allan D. Herrmann
*Assistant Examiner*—Nicholas Whitelaw
*Attorney, Agent, or Firm*—Foley & Lardner

[57] ABSTRACT

A rotational speed differential responsive type control coupling is provided with a device for manually or automatically preventing relative rotation of a drive housing and rotor in order to prevent working oil from being heated up to an excessively high temperature.

7 Claims, 12 Drawing Sheets

ROTATIONAL SPEED DIFFERENTIAL RESPONSIVE TYPE CONTROL COUPLING

BACKGROUND OF THE INVENTION

1. Field of the Invention

The present invention relates to hydraulic torque transmitting couplings and more particularly to control couplings of the rotational speed differential responsive type used as a driving torque distributing device, a differential slip limiting device, etc. in a multi-wheel drive vehicle such as a four-wheel drive vehicle.

2. Description of the Prior Art

An example of a prior art rotational speed differential responsive type control coupling is disclosed in Japanese Patent Provisional Publication No. 63-62635 or 63-62636.

A problem of the prior art control coupling is that it is liable to be heated up to an excessively high temperature when a vehicle on which it is installs makes a continuous running through an icy, muddy or sandy terrain or the like low-$\mu$ place, thus causing deterioration of parts made of rubber, sythetic resin, etc. and also deterioration of oil within a short period of usage and therefore considerably shortening the life of the coupling.

SUMMARY OF THE INVENTION

In accordance with the present invention, there is provided an improved rotational speed differential responsive type control coupling which comprises a first rotary member, a second rotary member rotatable relative to the first rotatary member, oil discharge means responsive to a rotational speed differential between the first and second rotary members for discharging a quantity of oil proportional to the rotational speed differential, restriction means for restricting discharge of oil by the oil discharge means and thereby producing an oil pressure for urging one of the first and second rotary members against the other and control means for controlling discharge of oil from the discharge means such that under a predetermined condition the discharge of oil from the discharge means is prevented thereby preventing substantial relative rotation of the first and second rotary members. The control means includes a rod installed concentrically on the first rotary member to extend between a spool camber and outside of the first rotary member and movable together with the spool, and an electric actuator for actuating the rod and the spool to move relative to the first rotary member. The actuator is disposed outside of the first and second rotary members and supported on a stationary portion of an associated device.

The above structure is effective for overcoming the above noted problems inherent in the prior art device.

It is accordingly an object of the present invention to provide an improved rotational speed differential responsive type control coupling which is prevented from being heated up to an excessively high temperature even when a vehicle on which it is installed makes a continuous running through an icy, muddy, sandy terrain or the like low-$\mu$ place.

It is another object of the present invention to make an improved rotational speed differential responsive type control coupling of the above described character which can improve the durability and elongate the life considerably.

It is a further object of the present invention to provide an improved rotational speed differential responsive type control coupling which can improve the driveability of the vehicle through the icy, muddy, sandy terrain or the like low-$\mu$ place.

It is a further object of the present invention to provide an improved rotational speed differential responsive type control coupling which can improve the ability of the vehicle getting out of the muddy terrain.

It is a further object of the present invention to provide an improved rotational speed differential responsive type control coupling which is reliable in operation.

DESCRIPTION OF THE PREFERRED EMBODIMENTS

Referring to FIGS. 1 to 7, a rotational speed differential responsive type control coupling "A1" according to an embodiment of this invention is installed on a four-wheel drive vehicle which is basically driven by front wheels.

Figure 7:
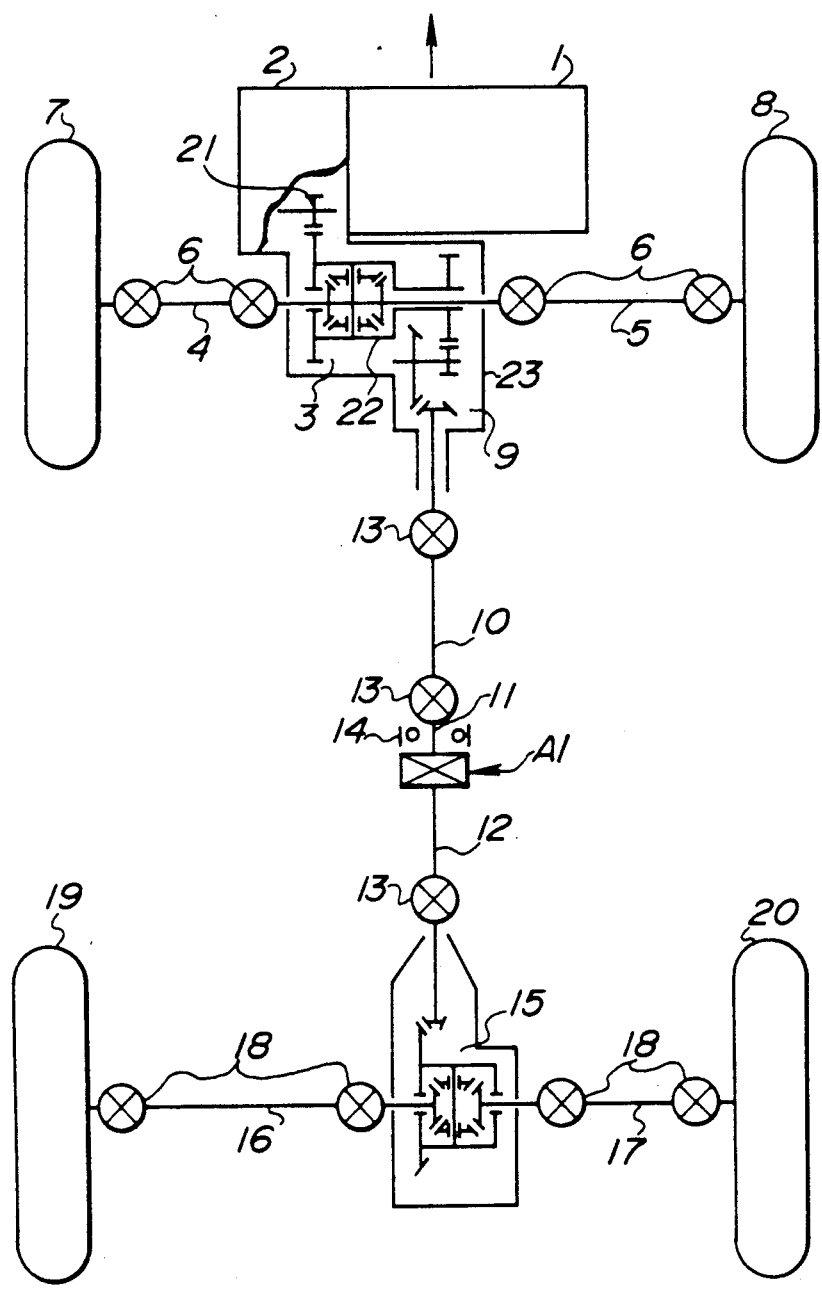
FIG. 7 is a schematic view of a vehicle drive line in which the coupling of FIG. 1 is incorporated.

As shown in FIG. 7, the coupling "A1" is installed in the rear wheel drive line of the four-wheel drive vehicle to serve as both a center differential and torque distributing device. The vehicle includes, as a front wheel drive line, an engine 1, transmission (including a clutch) 2, front differential 3, front axle shafts 4, 5, front axle shaft joints 6 and front wheels 7, 8. The vehicle further includes, as a rear wheel drive line, a transfer 9, front propeller shaft 10, center propeller shaft 11, rotational speed differential responsive type control coupling "A1", rear propeller shaft 12, propeller shaft joints 13, center bearing 14, rear differential 15, rear axle shafts 16, 17, rear axle shaft joints 18 and rear wheels 19, 20.

The front differential 3 is interposed between a final gear of the transmission 2 and the front axle shafts 4, 5. The rear differential 15 is interposed between the rear propeller shaft 12 and the rear axle shafts 16, 17.

The transfer 9 is operative to distribute part of an engine power or vehicle driving torque to the rear wheels 19, 20 and received in a transaxle casing 23 together with the front differential 3.

Figure 1:
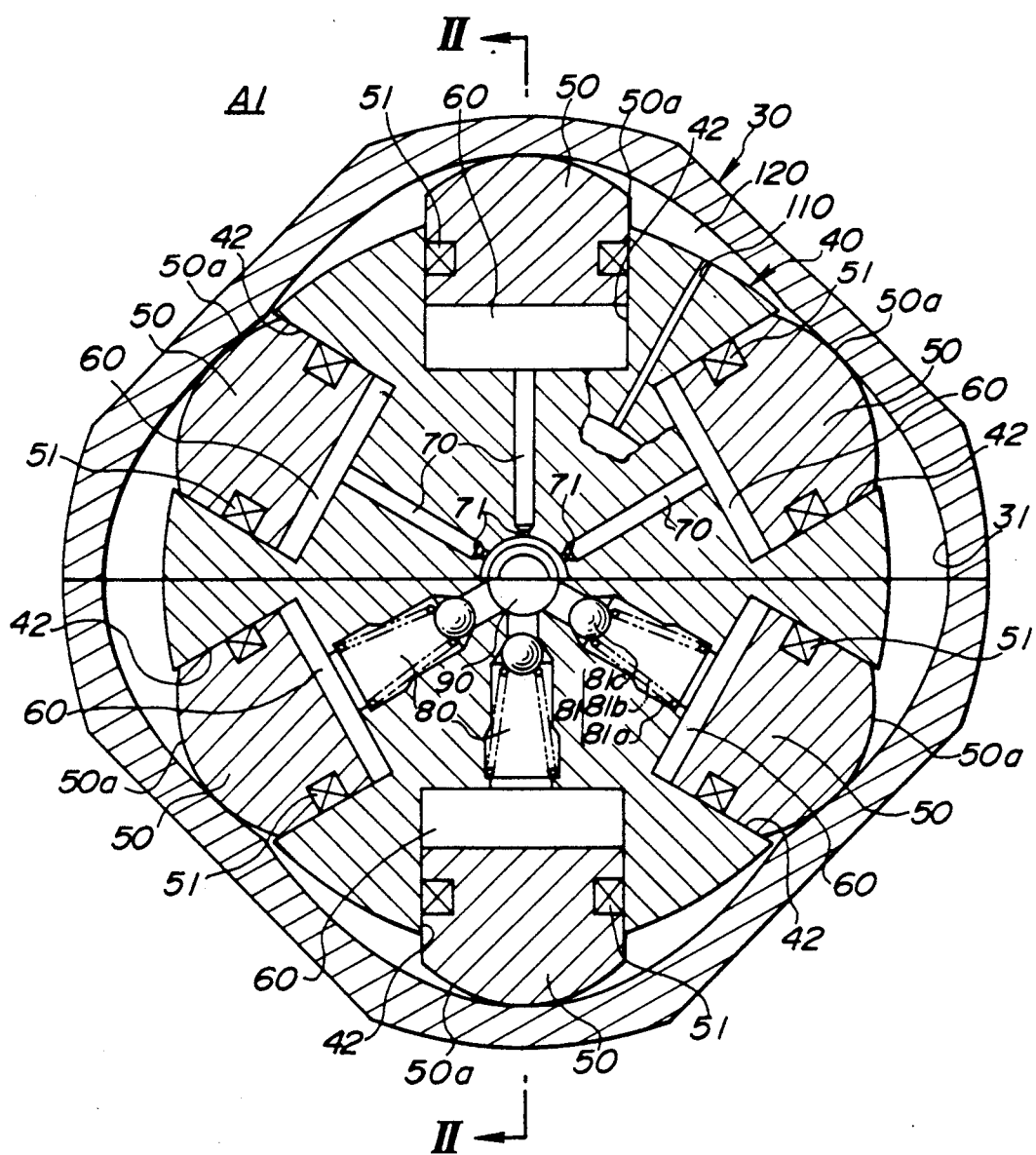
FIG. 1 is a sectional view taken along the line I—I of FIG. 2 and showing a rotational speed differential responsive type control coupling according to an embodiment of the present invention.
Figure 2:
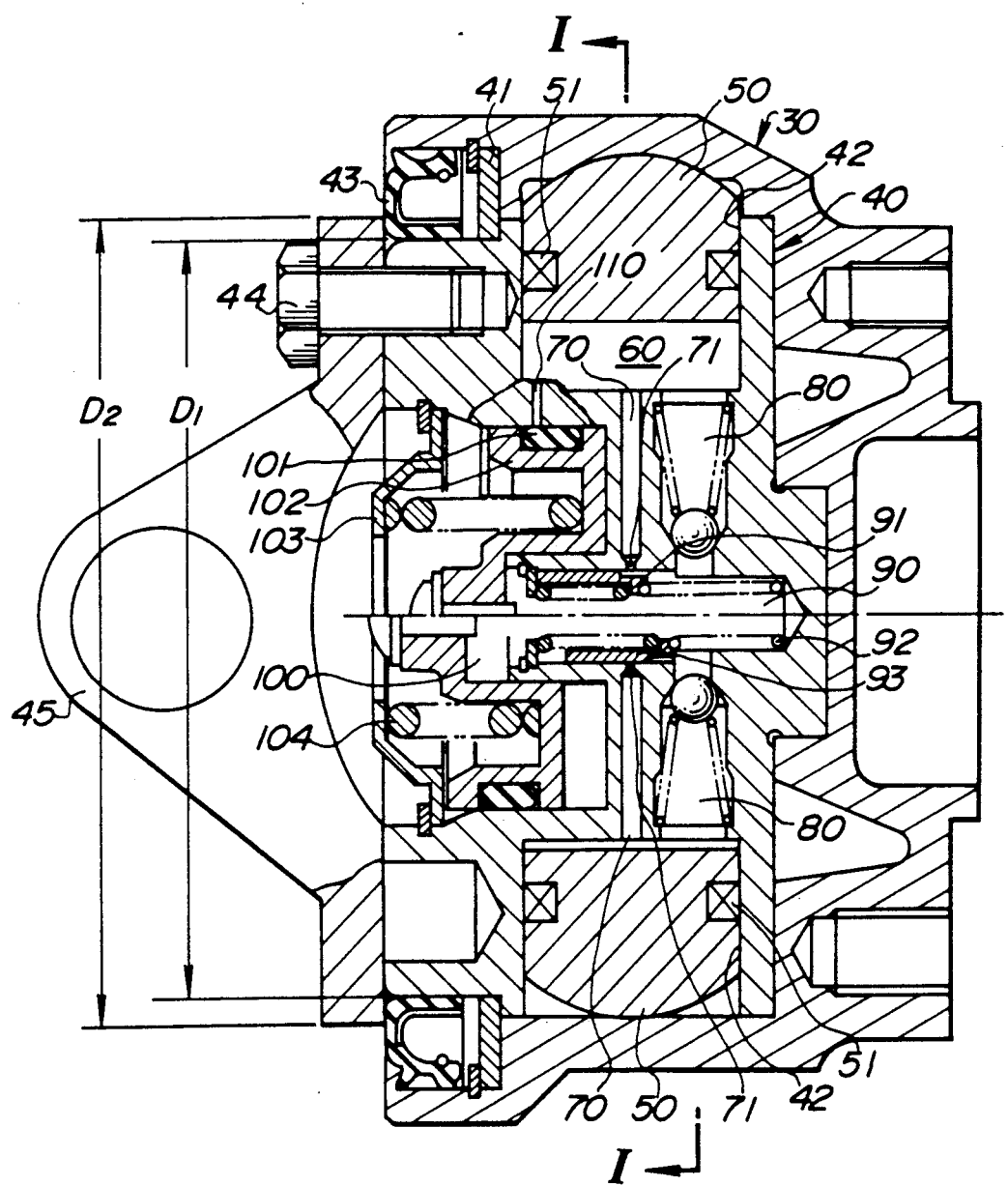
FIG. 2 is a sectional view taken along the line II—II of FIG. 1.
Figure 3:
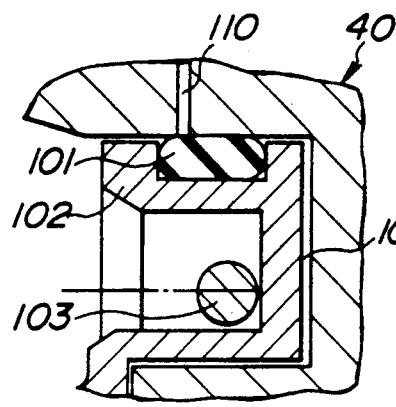
FIGS. 3 and 4 are enlarged views of a portion of FIG. 2 and illustrating an accumulator pressure relief mechanism.

As shown in FIGS. 2 and 3, the coupling "A1" mainly consists of a drive housing 30, rotor 40, pistons 50, pressure chambers 60, discharge passages 70, suction passages 80, spool chamber 90, accumulator chamber 100, and accumulator relief passage 110.

The drive housing 30 is bolted or otherwise secured to the center propeller shaft 11 and formed on an inner periphery a cam surface 31 in the form of having a series of circumferential spaced recesses shown as four.

The rotor 40 is rotatably installed in the drive housing 30 so as to slide on the cam surface 31 and bolted 44 or otherwise secured to a flange 45 which is in turn bolted or secured to the rear propeller shaft 12. The rotor 40 is held axially in place relative to the drive housing 30 by a stopper ring 41 which is installed in the drive housing 30 and held in place by a snap ring (no numeral). The rotor 40 is formed with six radial cylinders 42 which are spaced circumferentially of the rotor 40 at an equal angle from one another and are opened radially of the rotor 40 so as to oppose the cam surface 31.

The pistons 50 are installed in the respective cylinders 42 and cooperate with piston rings 51 installed thereon to sealingly define the pressure chambers 60 of variable volume. Each piston 50 is formed with a spherically shaped contact surface 50a for contact with the cam surface 31. The pistons 50 contact the cam surface 31 in the positions spaced, circumferentially of the drive housing 30, 60° from one another and operative to reciprocate radially of the rotor 40 upon occurence of a relative rotation of the drive housing 30 and rotor 30 or a rotational speed differential between the same.

The cam surface 31 is contoured such that at any angular position of the rotor 40 relative to the drive housing 30, substantially the same ratio of the input torque is transmitted from the drive housing 30 to the rotor 40 upon occurence of a rotational speed differential between the rotor 40 and drive housing 30. Such a cam surface 31 is described in detail in U.S. patent application Ser. No. 07/193,628 filed on May 13, 1988 by the applicants.

As shown in FIG. 2, a seal 43 is arranged adjacently outside of the stopper 41 to provide a seal between the rotor 40 and drive housing 30. To this end, the seal 43 has an outer peripheral sealing lip and is force-fitted on the rotor 40. In this connection, the seal 43 has an inner diameter D1 which is smaller than the outer diameter D2 of the flange 45.

With the seal 43 constructed and arranged as above, a centrifugal force generated at the time of rotation of the coupling "A1" is utilized to increase the force with which the seal 43 is pressed against the mating surface of the drive housing 30, thus making it possible to assuredly prevent oil leakage at the joint of the drive housing 30 and rotor 40. Further, slipping-off of the seal 43 is assuredly prevented by the output member 45.

The discharge passages 70 are formed in the rotor 40 for communicating the respective pressure chambers 60 with the spool chamber 90. The spool chamber 90 is in the form of a round hole formed concentric with the axis of rotation of the rotor 40, i.e., formed concentrically in the rotor 40. The discharge passages 70 are in the form of straight radial passages which are spaced circumferentially of the rotor 40 an equal angle, i.e., 60° from one another such that the discharge passages 70 are grouped into three pairs each of which have inner ends opposed diametrically of the rotor 40 or spool chamber 90. In this connection, it is constructed and arranged such that groups of two of the discharge passages 70 discharge oil of substantially the same pressure at any angle of the rotor 40 relative to the drive housing 30. The discharge passages 70 have at the inner ends flow restrictions 71, respectively.

The suction passages 80 are formed in the rotor 40 to communicate the respective pressure chambers 60 with the spool chamber 90 by way of check valves 81 such that oil is supplied from the spool chamber 90 to the pressure chambers 60 by way of the check valves 81 on the suction stroke of the pistons 50 during which the pistons 50 move radially outwards of the rotor 40. The suction passages 80 are arranged so as to coincide in position with the discharge passages 70 with respect to the circumferential direction of the rotor 40 but differ with respect to the aixal direction.

Each check valve 81 is constituted by an increased diameter passage portion 81a formed in each relief passage 80, a conical spring 81b having an end supported on an end of the increased diameter relief passage portion 81a and a ball 81c urged by the conical spring 81b against a conical seat (no numeral) formed in the relief passage 80.

In this instance, a spring retainer otherwise necessitated can be dispensed with and furthermore in case of a screw-in type spring retainer the threaded portion prepared prior to heat treatment is distorted after the heat treatment to disable attachment of the spring retainer.

Figure 5:
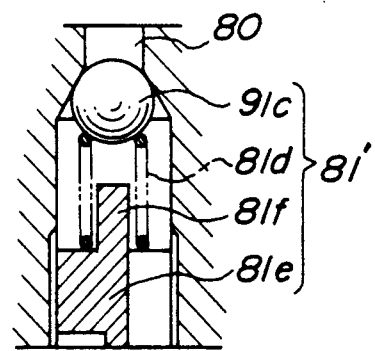
FIG. 5 is a sectional view of a check valve according to a variant of the present invention.
Figure 6:
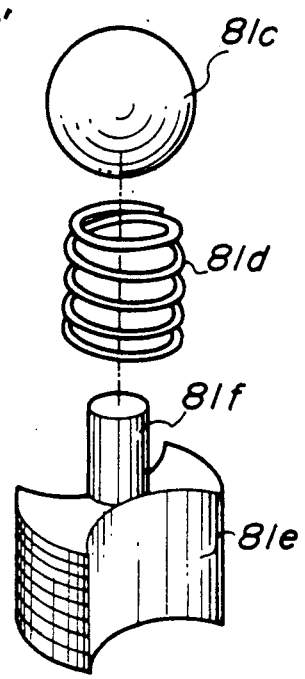
FIG. 6 is an exploded view of the check valve of FIG. 5.

As shown in FIGS. 5 and 6, a check valve 81' may be used in place of the above check valve 81. The check valve 81' consists of a ball 91c, coil spring 81d and spring retainer 81e. The retainer 81e is adapted to be screwed into the relief passage 80 and has a wing nut-like shape or part-cylindrical shape to provide a passage of oil. In this instance, by providing to the spring retainer 81e an integral stopper 81f for contact with the ball 81c and thereby preventing overstroke of same, it becomes possible to attain a valve action of the check valve 81' assuredly and with an improved responsiveness and thereby prevent oil leakage at the time of closure of the valve.

The spool chamber 90 is communicated with an accumulator chamber 100 which is arranged concentrically with the rotor 40. That is, the spool chamber 90 and accumulator chamber 100 are arranged side by side axially of the rotor 40. A spool 93 is axially movably disposed in the spool chamber 90 so as to be capable of selectively opening and closing the discharge passages 70, i.e., so as to be capable of making the orifices 71 effective or ineffective selectively. The spool 93 is urged by a coil spring 92 made of spring steel in the direction of opening the discharge passages 70 and by a spring 91 made of a shape memory alloy in the opposite direction. The spring 91 is adapted, when the temperature of oil rises beyond a predetermined value, to expand axially and move, prevailing the bias of the spring 92, the spool 93 into a position where it closes the discharge passages 70.

The accumulator chamber 100 stores oil to make ready for increase and decrease of oil in the pressure chambers 90. To this end, an accumulator piston 102 is slidably installed on the rotor 40 to define the accumulator chamber 100 which is variable in volume as it moves axially relative to the rotor 40. The accumulator piston 102 is sealed to the rotor 40 by means of a piston seal 101. A spring retainer 103 is installed on the rotor 40 and held in place by a snap ring (no numeral). A coil spring 104 is interposed between the accumulator piston 102 and the spring retainer 103 for urging the accumulator piston 102 in the direction of decreasing the volume of the accumulator chamber 100.

A relief passage 110 is formed in the rotor 40 for regulating the maximum pressure of oil in the accumulator chamber 100, i.e., the maximum torque transmitted by the joint "A1". To this end, the relief passage 110 is adapted to connect the accumulator chamber 100 to a drain chamber 120 defined between the outer periphery of the rotor 40 and the cam surface 31.

The relief passage 110 has on the accumulator chamber 100 side an end which is closed by the piston seal 101, as shown in an enlarged scale in FIG. 3, when the pressure in the accumulator chamber 100 is low.

Figure 4:
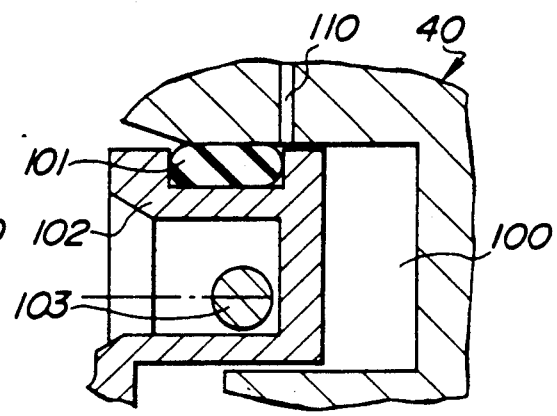

By axial movement of the piston 102, the piston seal 101 is operative to open, as shown in an enlarged scale in FIG. 4, and close, the corresponding end of the relief passage 110, thus making it possible to dispense with such a check valve that must be installed axially of the spool chamber and therefore making it possible to reduce the axial size of the coupling "A1".

The operation of the coupling will be described hereinbelow.

(I) In the case where there is no rotational speed differential ΔN between front and rear wheels:

This case takes place when the vehicle travels on a dry asphalt pavement, etc. at low to middle speed. When the rotational speed differential ΔN does not take place between the front and rear wheels, a relative rotation of the drive housing 30 and rotor 40 does not take place, thus not causing the pistons 50 to reciprocate radially of the rotor 40 and therefore not causing any torque to be transmitted to the rear wheels 19, 20 through the coupling "A1". Accordingly, an engine power or vehicle driving torque is transmitted only to the front wheels 7, 8 to attain a two-wheel drive by the front wheels 7, 8.

In this instance, when the vehicle is running straight-ahead at high speed on a highway, the rotor 40 rotates at high speed in response to rotation of the rear wheels 19, 20, thus subjecting the pistons 50 to a large centrigual force Fc which is obtained by the following equation.

$$Fc = \frac{m \cdot v^2}{r}$$

where m is the mass of each piston 50, r is the distance between the axis of rotation of the rotor 40 and the center of gravity of the piston 50 and v is the rotational speed of the rotor 40. The centrifugal force Fc thus increases in proportion to the square of the vehicle speed.

The centrifugal force Fc urges the pistons 50 against the cam surface 31, thus transmitting a torque Δ Tco proportional to the centrifugal force Fc to the rear wheels 19, 20 and thereby making it possible to improve the high-speed straight-ahead running stability of the vehicle.

(II) In the case where there occurs a rotational speed differential ΔN between front and rear wheels:

This case takes place when the accelerator pedal is depressed quickly or urgently to start or accelerate the vehicle or when the vehicle travels on the wet road, snow-covered road, muddy road or the like low-μ surface. When the continuously driven front wheels 7, 8 slip to cause a rotational speed differential ΔN between the front and rear wheels, a relative rotation of the driving housing 30 and rotor 40 is caused, thus causing the pistons 50 to move radially of the rotor 40. When the driving pistons 50 are driven to move radially inwardly of the rotor 40 to reduce the volumes of the pressure chambers 60, the oil pressures within the pressure chambers 60 is increased by the effect of the resistance of flow through the variable orifice 71 and urges the pistons 50 against the cam surface 31 with forces obtained by multiplying the pressures within the cylinder chambers 60 by the effective pressure receiving area of the pistons 50. This force causes a driving torque ΔT to be transmitted to the rear wheels 19, 20.

Figure 8:
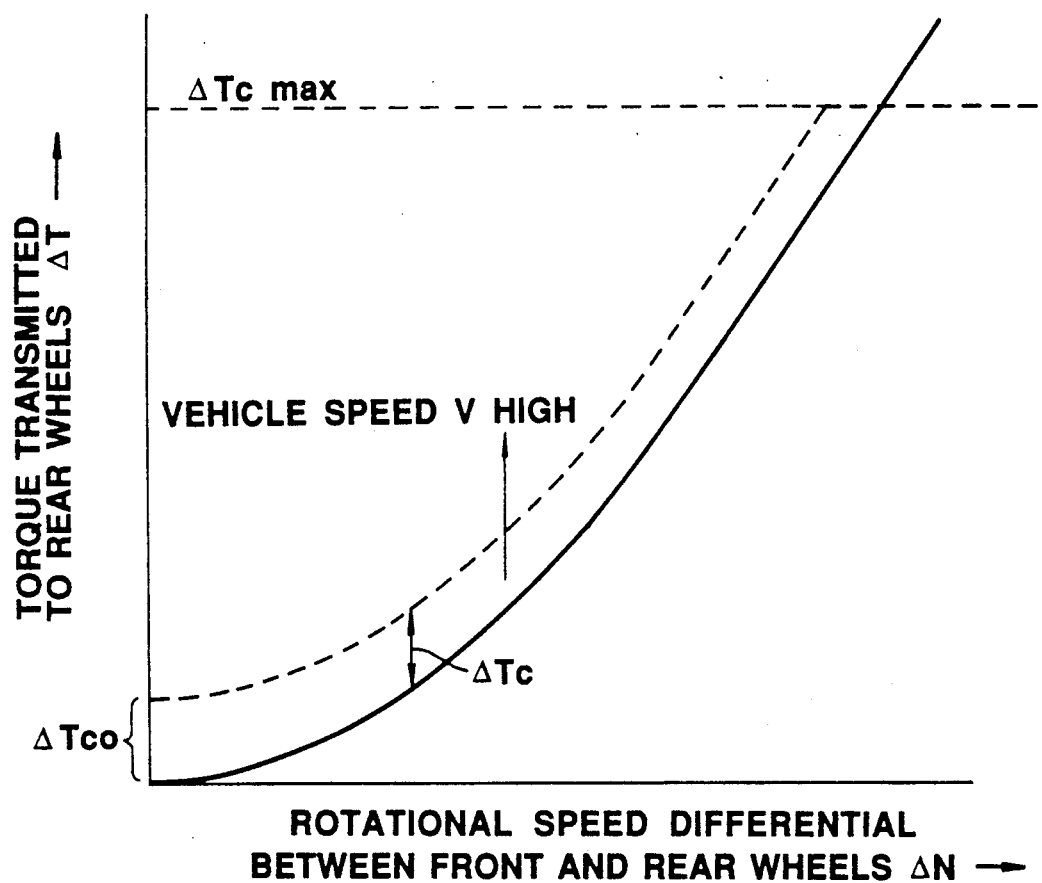
FIG. 8 is a graph showing a torque transmitting chracteristic of the control coupling of FIG. 1.

The torque ΔT transmitted to the rear wheels 19, 20 and the pressure differential across the orifices 71 increase with increase of the rotational speed differential between the front and rear wheels such that a torque transmitting characteristic respresented by the solid line curve in FIG. 8 is attained. In this instance, a larger torque ΔTc for a given rotational speed differential is transmitted to the rear wheels 19, 20 as the vehicle speed becomes larger as indicated by the two-dot chain line curve in FIG. 8.

Accordingly, when slippage of the front wheels 7, 8 take place, the vehicle drive mode is automatically changed from the two-wheel drive by the front wheels 7, 8 to the four-wheel drive thereby stopping slippage of the front wheels 7, 8 and improving the starting, accelerating and coasting abilities and stabilities of the vehicle when travelling on the wet road, snow-covered road or the like slippery road surface and the ability of the vehicle getting away from the muddy terrain.

In the meantime, the relief passage 110 is operative to keep the maximum oil pressure within the coupling "A1" below a critical value at which breakage of the coupling "A1" and its associated drive line may occur. The maximum driving torque ΔTc max to be transmitted to the front wheels 7, 8 is thus determined based on the maximum oil pressure.

(III) In case of high oil temperature:

In case there is a certain torque to be transmitted through the coupling "A1" and there is a certain amount of oil to be discharged being driven by the pistons 50, oil passes through the discharge passages 70 to flow into the spool chamber 90 and accumulator chamber 100 after being subjected to restriction at the orifices 71. In this instance, since oil is subjected to compression under an adiabatic condition, heat is generated to increase the temperature of oil. When the rotational speed differential is small, the energy converted into heat is small and therefore the temperature of the oil does not increase so high. Further, even when a large rotational speed differential takes place for a moment, the temperature of oil does not increase so high at once due to the heat capacities of the associated elements or parts.

However, when the vehicle travels continuously through an icry, muddy or sandy terrain or the like low-μ place where a rotational speed differential between the front and rear wheels is caused continuously, a large energy is continuously converted into heat and therefore the temperature of oil increases so high. By this, the temperatures of the associated parts as the drive housing 30, etc. increase so higher and in some cases increase equal to or high than 120° C. When this is the case, the seals made of rubber or synthetic resin are deteriorated within a short period of usage and lubrication becomes worse, thus causing, in a worst case, seizure of the sliding portions of the coupling "A1".

In order to prevent such deterioration and seizure, the discharge passages 70 are closed by the spool 93 to prevent the flow of oil into the accumulator chamber 100. That is, when the temperature of oil is low, the spool 93 is urged by the spring 92 into a position shown by its upper half in FIG. 2, where it opens the discharge passages 70, thus holding the couplings "A1" in a normal operating condition where the drive housing 30 and rotor 40 are relatively rotatable to transmit a torque proportional to a rotational speed differential between the front and rear wheels. However, when the temperature of oil rises beyond a predetermined value, the spring 91 made of a shape memory alloy and responsive to the highest temperature of oil within the coupling "A1" expands axially to drive the spool 93 into a position shown by its lower half in FIG. 2, prevailing the bias of the spring 92 and thereby causing the spool 93 to close the discharge passages 70. This prevents or suppresses the relative rotation of the drive housing 30 and rotor 40 and thereby prevents the temperature of oil from rising further. That is, when the discharge passages 70 or orifices 71 are closed, flow of oil through the orifices 71 does not occur, thus making it possible to prevent the temperature of oil from rising further. The heat of oil is then emitted outside, i.e., radiated and therefore the temperature of oil falls gradually.

In the foregoing, it is to be noted that each of the three pairs of discharge passages 70 have inner ends opposed radially of the spool chamber 90 and are adapted to discharge through the inner ends oil of substantially the same pressure, thus making it possible to balance the radial oil pressures applied from the discharge passages to the spool 93 and therefore making it possible for the spool 93 to slide smoothly in the spool chamber 90 to open and close the discharge passages 70.

It is further to be noted that the spring 91 made of a shape memory alloy has a hysterisis in elongation relative to temperature, i.e., the elongation of the spring 91 is less at a given temperature when the temperature is decreasing than when the temperature is increasing. By this, the spool 93 is prevented from opening the discharge passages 70 immediately when the flow of oil is stopped and the temperature of oil starts decreasing, thus making it possible to prevent a so-called hunting phenomenon in the control of the position of the spool 93 by the springs 91, 92. The spool 93 is thus operative to close the discharge passages 70 immediately when a predetermined temperature of oil or critical temperature of the coupling "A1" is reached and open the discharge passages 70 when the temperature of oil falls a little below the predetermined temperature at which the discharge passages 70 are closed. The coupling "A1" and its associated vehicle drive line are thus assuredly prevented from being heated up to a dangerously high temperature even when the vehicle makes a continuous running under a severe weather and road condition.

In the meantime, the rotational speed differential responsive type control coupling "A1" is provided for primarily preventing a tight corner braking and improving the starting ability and the cornering ability of an associated vehicle on an usual paved road, etc. However, when the vehicle travels through the icy, muddy or sandy terrain, one or some of the wheels are likely to slip and dig deeply into snow, mud or sand, thus making the ability of getting out of the icy, snow-covered, muddy or sandy terrain poor as compared with that of the four-wheel drive vehicle the wheels of which rotate at completely the same speed. The control coupling "A" of this invention enables the vehicle to effect a part-time four-wheel drive by closing the discharge passages 70 and therefore can attain an improved driveability of the vehicle. In the meantime, when the vehicle travels through the icy terrain or the like low-μ place, the tight corner braking or the like phenomenom does not occur as is well known in the art.

It is further to be noted that the control coupling "A1" may otherwise be incorporated in a front propeller shaft of a front wheel drive line of a four-wheel drive vehicle which is driven basically by rear wheels.

It is further to be noted that the spring made of a shape memory alloy described above is adapted to serve as both a temperature sensor and actuator for actuating the spool. In place of such a spring made of a shape memory alloy, a spring made of bimetal, a device for utilizing a variation of the nature of oil depending upon variation of the temperature, a device constituted by a combination of an oil temperature sensor and an actuator, etc. may be employed.

It is further to be noted that the coupling of this invention in not limited to the application to a four-wheel drive vehicle but may otherwise be applied to a differential for front wheels or rear wheels of a two-wheel drive vehicle.

Referring to FIGS. 9 to 13, in which like parts and portions to the previous embodiment are designated by the same reference characters, another embodiment of this invention will be described.

Figure 12:
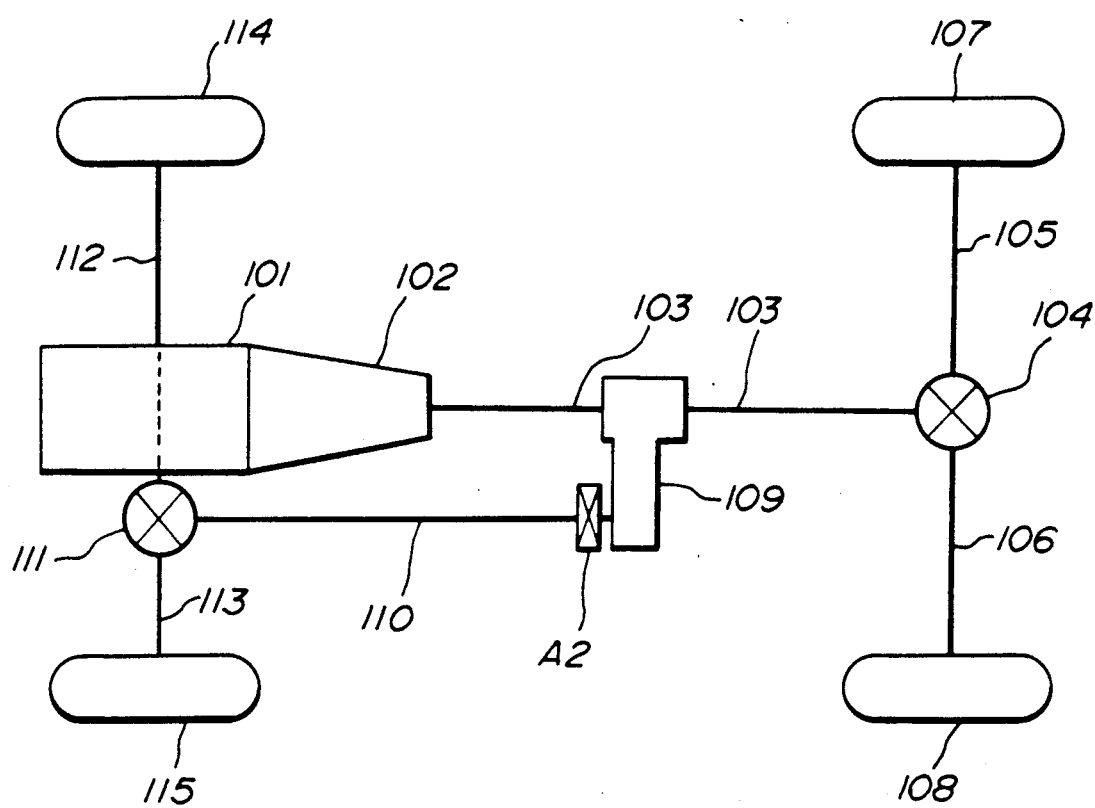
FIG. 12 is a schematic view of an automotive vehicle drive line incorporating the transfer and control coupling of FIG. 9.

Referring first to FIG. 12, a rotational speed differential responsive type control coupling "A2" according to another embodiment of this invention is installed on a part-time four-wheel drive vehicle which is basically driven by rear wheels.

The vehicle includes, as a rear wheel drive line, an engine 101, transmission 102, rear propeller shafts 103, rear differential 104, rear axle shafts 105, 106 and rear wheels 107, 108. The vehicle further includes, as a front wheel drive line, a transfer 109, rotational speed differential responsive type control coupling "A2", front propeller shaft 130, front differential 111, front axle shafts 112, 113 and front wheels 114, 115.

Figure 9:
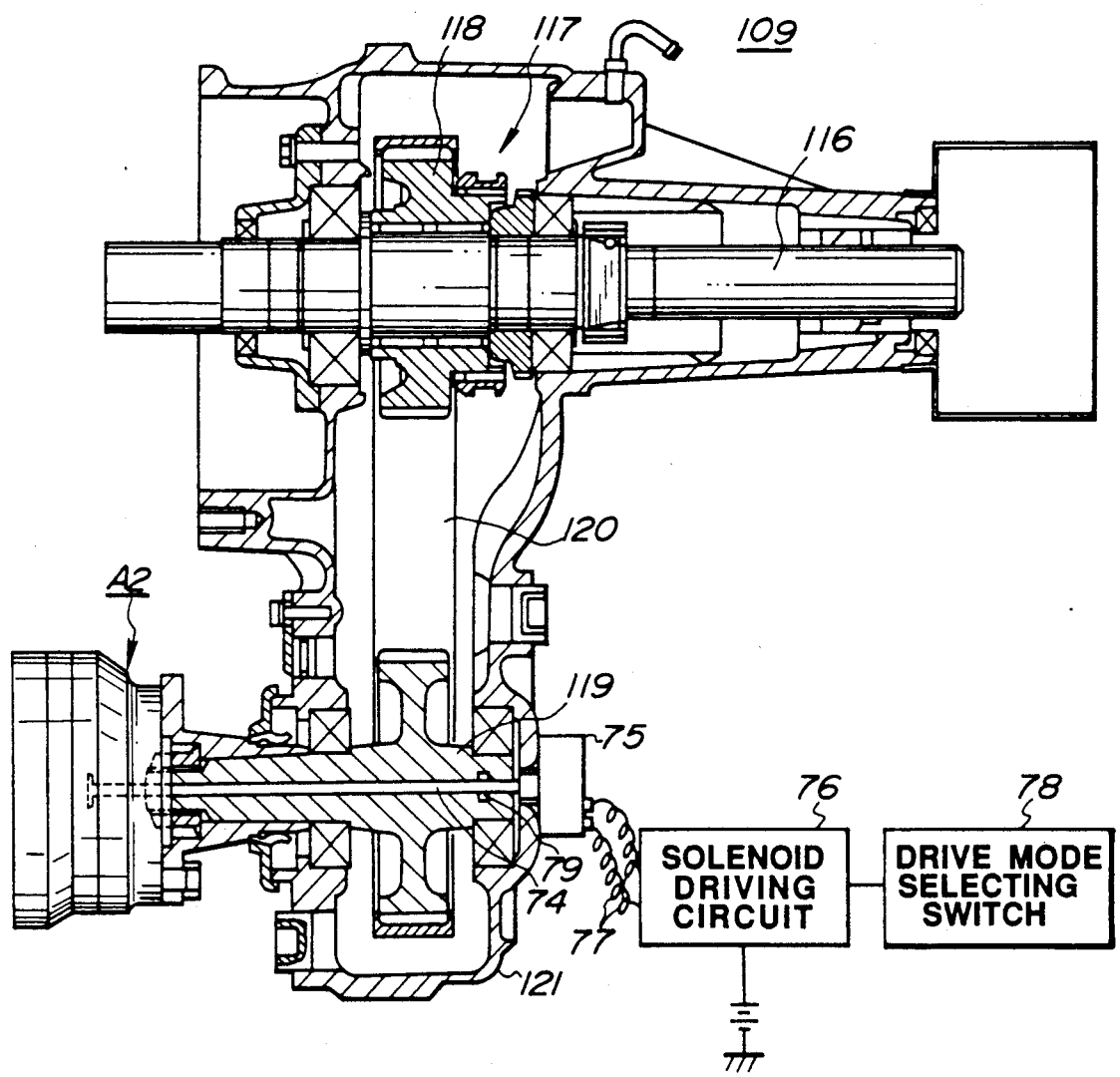
FIG. 9 is a sectional view of a transfer incorporating a rotational speed differential responsive type control coupling according to another embodiment of the present invention.

As shown in FIG. 9, the transfer 109 includes a transfer input shaft 116 directly connected to the rear propeller shafts 103, an input pulley 118 connected through a 2WD-4WD selecting clutch 117 to the transfer input shaft 116, an output pulley 119 connected through the coupling "A2" to the front propeller shaft 130, a belt 120 placed around the input pulley 120 and output pulley 119 to drivingly interconnect the same and a transfer casing 121 accomodating therein the above described constituent parts of the transfer 109.

Figure 10:
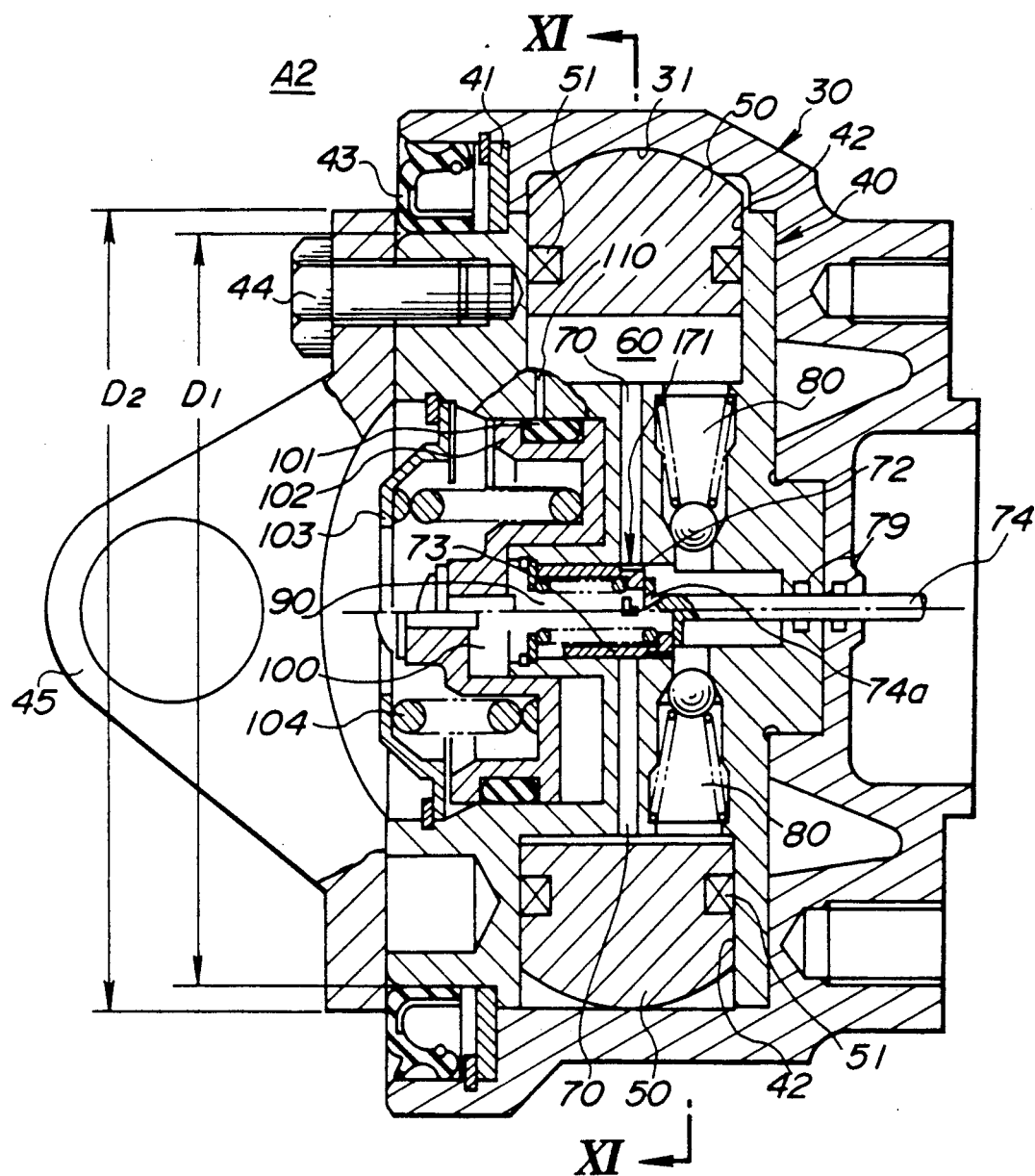
FIG. 10 is a sectional view taken along the line X—X of FIG. 11 and showing the control coupling of FIG. 9.
Figure 11:
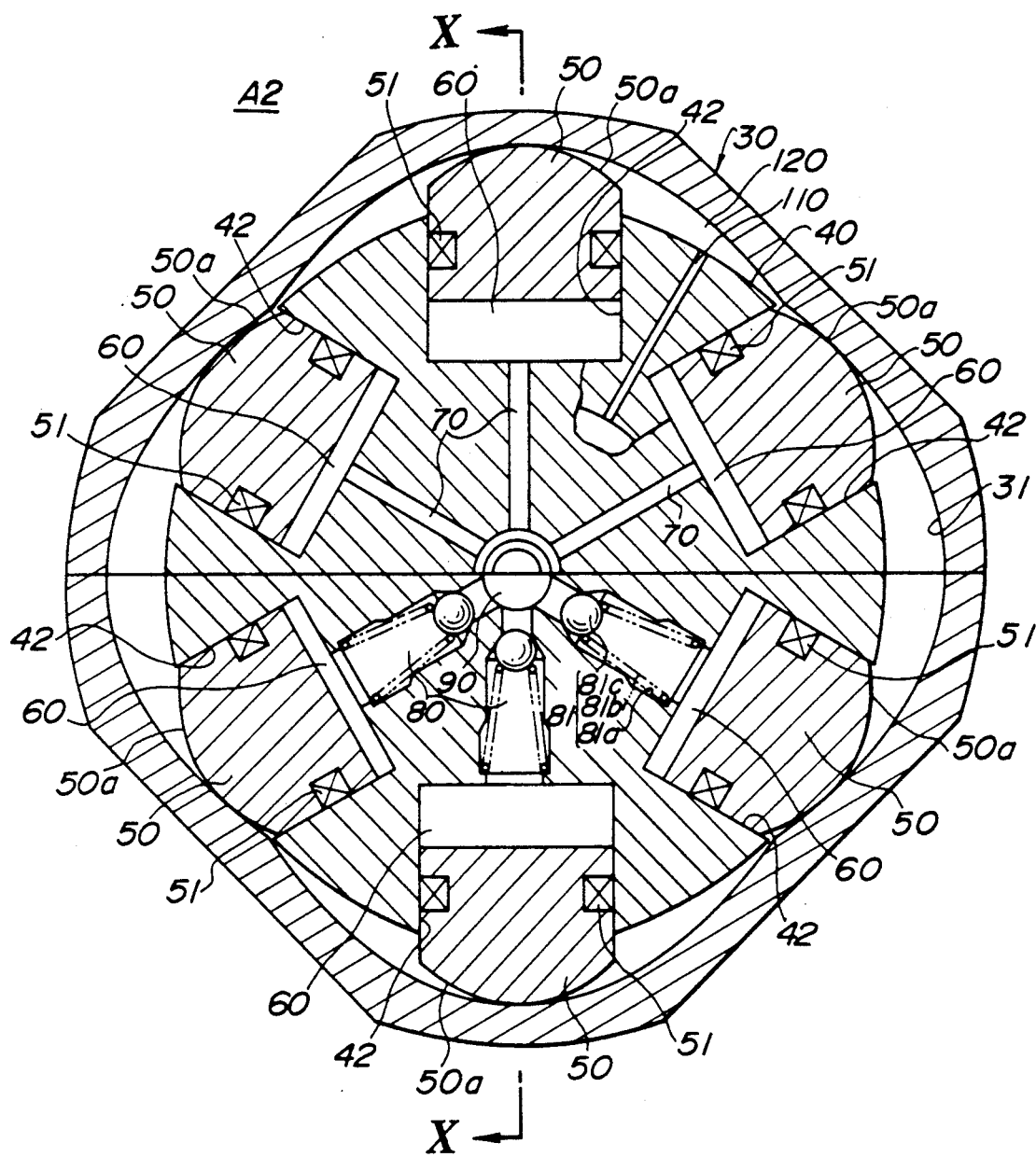
FIG. 11 is a sectional view taken along the line XI—XI of FIG. 10.

As shown in FIGS. 10 and 11, the coupling "A2" is substantially similar to the coupling "A1" of the previous embodiment except for the following structure.

A variable orifice 171 is disposed between the spool chamber 90 and its associated ends of the discharge passages 70 for restricting flow of oil therethrough.

The variable orifice 171 consists of a hollow orifice spool 73 axially slidably disposed in the spool chamber 90 and operative to open and close the associated ends of the discharge passages 70 and a spring 72 for urging the spool 73 in a predetermined direction, i.e., rightwardly in FIG. 2. More specifically, the orifice spool 73 has a larger diameter portion fitted in the spool chamber 90 and a smaller diameter portion cooperating with the wall of the spool chamber 90 to define therebetween an annular restriction passage through which the discharge passages 70 communicate with the spool chamber 90.

A control unit for controlling the operation of the orifice spool 73 is provided outside of the transfer casing 121. The control unit mainly consists of a rod 74 arranged concentrically with the drive housing 30 and rotor 40, solenoid 75, solenoid drive circuit 76, electrical wiring 77 and mode switch 78.

The rod 74 has an inner end protruding into the spool chamber 90 to contact an end of the orifice spool 73 and an outer end protruding outside of the drive housing 30. As shown in FIG. 9, the solenoid 75 is installed on the transfer casing 21 and connected to the solenoid drive circuit 76 by way of the electric wiring 77. The solenoid drive circuit 76 is connected to the drive mode selecting switch 78 for selecting one of a full automatic 4WD mode and fixed 4WD mode.

Further, the rod 74 is formed with a communication passage 74a for providing communication between the opposite spool chamber sections separated by the inner end of the rod 74 contacting the mating end of the orifice spool 73. The rod 74 is supported by the output pulley 119, drive housing 30 and rotor 40 and sealed to same by means of O-rings 79.

The operation of the coupling "A2" will be described hereinbelow.

(I) In case of a full automatic 4WD mode:

The full automatic 4WD mode is attained when the 2WD-4WD selecting clutch 117 is operated to select the 4WD mode and when the drive mode selecting switch 78 is operated to select the full automatic 4WD mode. When this is the case, an electrical signal for pushing the rod 74 leftwards in FIG. 10 is supplied from the solenoid drive circuit 76 through the electrical wiring 77 to the solenoid 75 in response to selection of the full automatic 4WD mode by the drive mode selection switch 78.

By the selection of the full automatic 4WD mode, the orifice spool 73 is moved into the position shown by its upper half in FIG. 10, thus providing communication between the balance passage 70 and spool chamber 90 through the variable orifice 171 of a predetermined opening area.

In the case where $\Delta N=0$:

This case takes place when the vehicle travels on a dry asphalt pavement, etc. at low to middle speed. When the rotational speed differential $\Delta N$ does not take place between the front and rear wheels, a relative rotation of the drive housing 30 and rotor 40 does not take place, thus not causing the pistons 50 to reciprocate radially of the rotor 40 and therefore not causing any torque to be transmitted to the front wheels 114, 115 through the coupling "A2". Accordingly, an engine power or vehicle driving torque is transmitted only to the rear wheels 107, 108 to attain a two-wheel drive by the rear wheels 107, 108.

In this instance, when the vehicle is running straight-ahead at high speed on a highway, the rotor 40 rotates at high speed in response to rotation of the front wheels 114, 115, thus subjecting the pistons 50 to a large centrigual force. The centrifugal force urges the pistons 50 against the cam surface 31, thus transmitting a torque proportional to the centrifugal force to the front wheels 114, 115 and thereby making it possible to improve the high-speed straight-ahead running stability.

In case where $\Delta N>0$:

This case takes place when the accelerator pedal is depressed quickly or urgently to start or accelerate the vehicle or when the vehicle travels on the wet road, snow-covered road, muddy road or the like low-$\mu$ place. When the continuously driven rear wheels 107, 108 slip to cause a rotational speed differential $\Delta N$ between the front and rear wheels, a relative rotation between the drive housing 30 and rotor 40 is caused, thus causing the pistons 50 to move radially of the rotor 40. In this instance, when the driving pistons 50 are driven to move radially inwardly of the rotor 40 to reduce the volumes of the pressure chambers 60, the pressures within the pressure chambers 60 are increased by the effect of the resistance of flow through the variable orifice 71 and urge the pistons 50 against the cam surface 31 with forces obtained by multiplying the pressures within the cylinder chambers 60 by the effective pressure receiving area of the pistons 50. This force causes a driving torque $\Delta T$ to be transmitted to the front wheels 14, 15.

Figure 13:
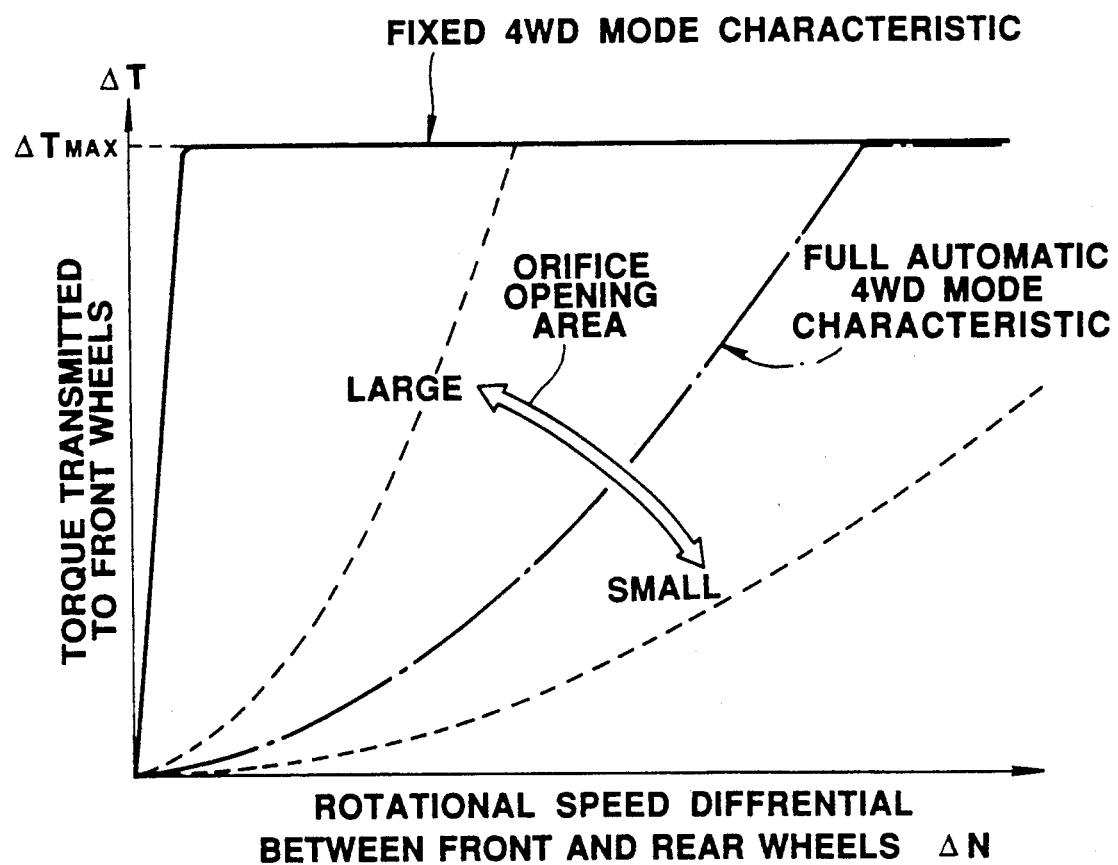
FIG. 13 is a graph of a torque transmitting characteristic of the control coupling of FIG. 9.

The torque $\Delta T$ transmitted to the front wheels 114, 115 and the pressure differential across the variable orifice 71 increase with increase of the rotational speed differential between the front and rear wheels such that a torque transmitting characteristic respresented by the dotted line curves or one-dot chain line curve in FIG. 13 is attained.

As seen from FIG. 13, the torque transmitting characteristic can be varied depending upon variation of the set opening area of the variable orifice 71 for a given rotational speed differential between the front and rear wheels. That is, when the opening area of the variable orifice 71 for a given rotational speed differential between the front and rear wheels is set smaller, a larger driving torque is transmitted to the front wheels in response to the given rotational speed differential. On the other hand, when the opening area is set larger, a smaller driving torque is transmitted to the front wheels.

Accordingly, when slippage of the rear wheels 107, 108 takes place, the vehicle drive mode is automatically changed from the two-wheel drive by the rear wheels to the four-wheel drive for thereby stopping slippage of the rear wheels 107, 108 and improving the starting, accelerating and coasting abilities and stabilities of the vehicle which is travelling on a slippery road such as a wet road and snow-covered road and improving the ability of the vehicle getting away from a muddy terrain.

In the meantime, the relief passage 110 is operative to keep the maximum fluid pressure within the coupling "A2" below a critical value at which breakage of the coupling "A" and its associated drive line may occur. The maximum driving torque $\Delta Tmax$ to be transmitted to the front wheels 114, 115 is thus determined based on the maximum fluid pressure.

(II) In the case of a fixed 4WD mode:

This case is attained when the 2WD-4WD selecting clutch 117 is operated to select the 4WD mode and when the drive mode selecting switch 78 is operated to select the fixed 4WD mode. When this is the case, an electrical signal for pulling the rod 74 rightwardly in FIG. 10, i.e., outwardly of the joint "A2" is supplied from the drive circuit 76 through the electric wiring 77 to the solenoid 75 in response to selection of the fixed 4WD mode by the selection switch 78.

By the selection of the fixed 4WD mode, the orifice spool 73 is moved into the position shown by its lower half in FIG. 10, thus obstructing communication between the discharge passage 70 and spool chamber 90.

When this is the case, oil is confined within the pressure chambers 60 and only a small rotational speed differential ΔN can take place between the front and rear wheels, thus allowing the pistons 50 and cam surface 31 to be joined together to transmit a driving torque therebetween.

That is, a torque transmitting characteristic represented by the solid line in FIG. 13 is obtained. The coupling "A2" thus substantially directly connects the rear propeller shafts 103 and front propeller shaft 130 together and therefore attains a fixed four-wheel drive in which the front and rear drive lines are substantially directly connected to each other.

Accordingly, in case of the fixed 4WD mode, there is not caused such a loss of power that takes place in case of the full automatic 4WD mode, thus making it possible to transmit a larger driving torque ΔT to the front wheels 114, 115 and furthermore attain continuous transmission of a driving torque since no substantial heat is generated and therefore making it possible to adapt the vehicle for running on off-road, snow-covered road, icy road, etc.

Except for the above, this embodiment is substantially similar to the previous embodiment of FIGS. 1 to 8.

Figure 14:
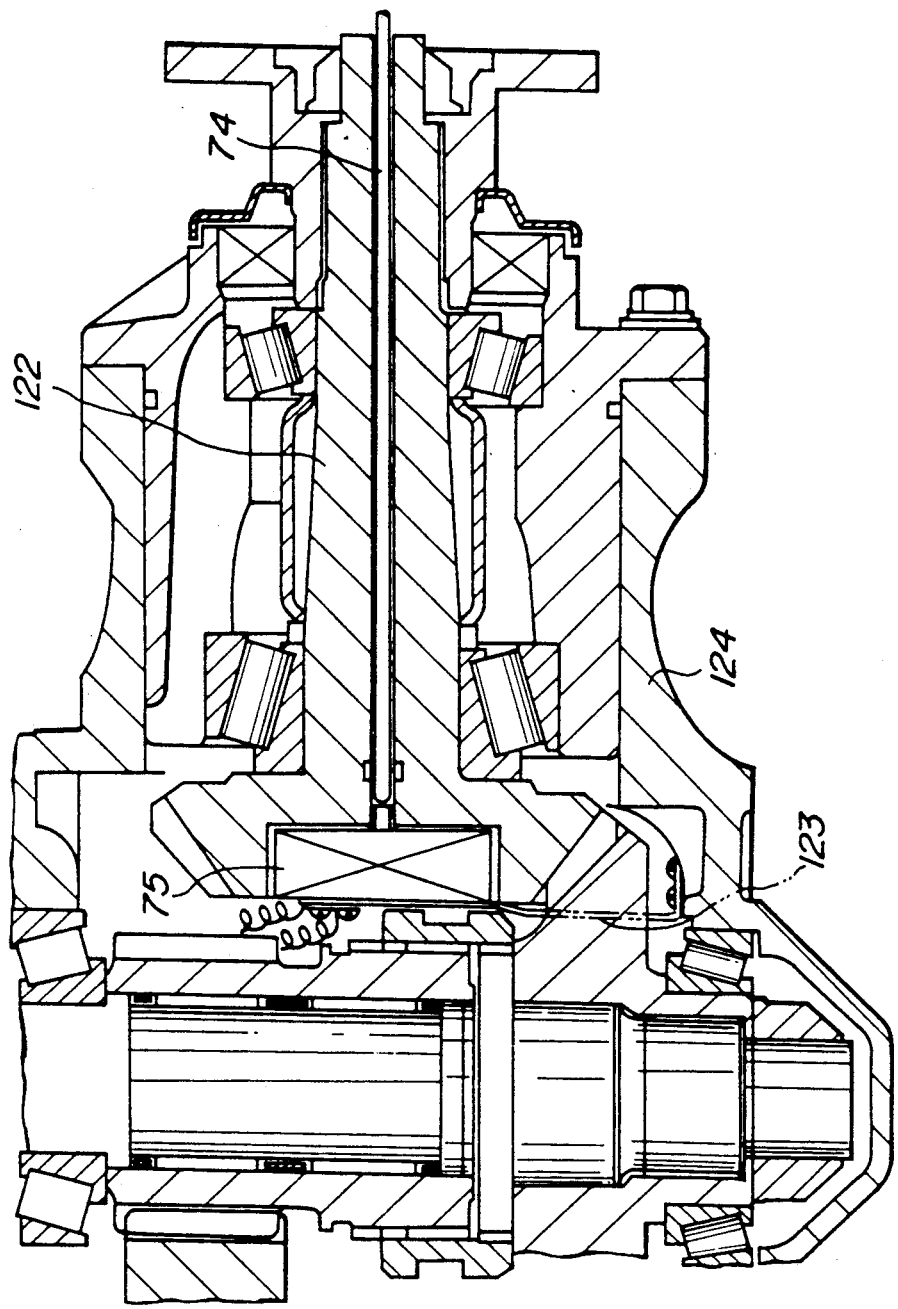
FIG. 14 is a fragmentary sectional view of a transfer in which an actuator is disposed within a transfer casing according to a modification of the present invention.

In the meantime, while the solenoid 75 has been described and shown as being disposed outside of the transfer casing and attached to same, it may otherwise, as shown in FIG. 14, be embedded in a bevel gear shaft 122 and secured to the transfer case 124 by way of a support 123 in case the coupling "A2" is incorporated in the rear wheel drive line of a part-time 4WD vehicle the main drive of which is a front wheel drive.

Figure 15:
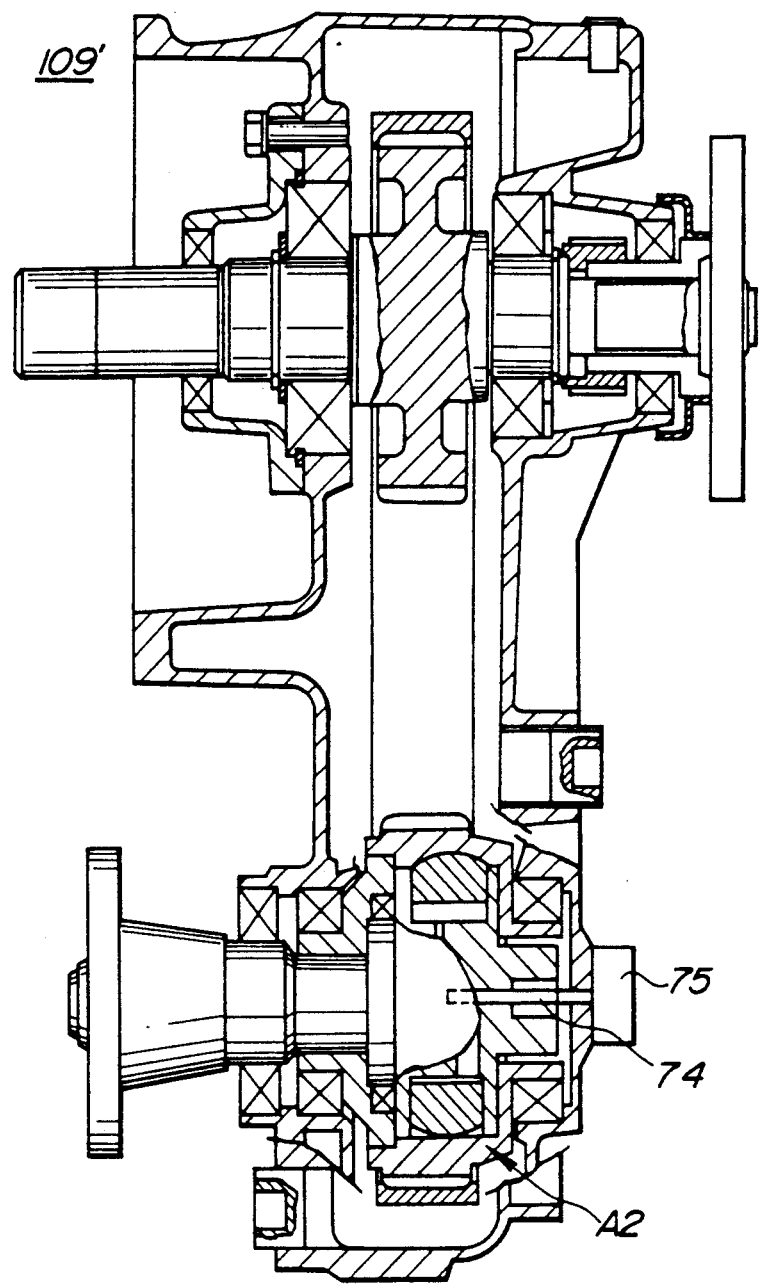
FIG. 15 is a fragmentary sectional view of a transfer in which a rotational speed differential responsive type control coupling is disposed within a transfer according to another modification of the present invention.

Further, while the coupling "A2" has been described and shown as being disposed outside of the transfer 109, it may otherwise, as shown in FIG. 15, be disposed within a transfer 109 by making the drive housing 30 serve as an output pulley in case of being installed in the front wheel drive line of a full-time 4WD vehicle the main drive of which is a rear wheel drive.

Further, while the variable orifice has been described and shown as performing two-step variations in orifice opening area, i.e., a fully closed condition and a predetermined opening condition, it may otherwise be constructed so as to perform multi-step variations or continuous variation.

Further, while the orifice opening has been described and shown as being varied by manual operation of a vehicle driver, it may otherwise be varied suitably in response to signals from a vehicle speed sensor, acceleration sensor, steering angle sensor, etc. so as to be automatically variable depending upon road surface conditions, vehicle loaded conditions, running conditions, etc. For example, the orifice opening may be controlled to effect a fine variation such that the detected rotational speed differential between the front and rear wheels is regulated to a target value.

Further, while the solenoid has been described and shown as being an actuator for actuating the variable orifice, it may otherwise be an electric motor, etc.

What is claimed is:

1. A control coupling comprising:
   a first rotary member;
   a second rotary member rotatable relative to said first rotary member;
   oil discharge means responsive to a rotational speed differential between said first and second rotary members for discharging a quantity of oil proportional to said rotational speed differential;
   restriction means for restricting discharge of oil by said oil discharge means and thereby producing an oil pressure for urging one of said first and second rotary members against that other; and
   control means for controlling discharge of oil from said discharge means such that under a predetermined condition said discharge of oil from said discharge means is prevented thereby preventing substantial relative rotation of said first and second rotary members;
   said control means including a spool chamber concentrically formed in said first rotary member and a spool movable in said spool chamber;
   said oil discharge means including a plurality of discharge passages formed in said first rotary member and having ends directly connected to said spool chamber and equally spaced circumferentially along said first rotary member;
   said spool being axially movable to open and close said ends of said discharge passages;
   said discharge passages being grouped such that grouped two of said discharge passages have said ends opposed diametrically of said spool chamber and discharge oil of substantially the same pressure at any angle of said first rotary member relative to said second rotary member;
   said spool having an outer periphery which cooperates with said ends of said discharge passages to constitute a variable orifice variable in opening depending upon variation of position of said spool relative to said first rotary member;
   said control means including a rod installed concentrically on said first rotary member to extend between said spool chamber and outside of said first rotary member and movable together with said spool, and an electric actuator for actuating said rod and said spool to move relative to said first rotary member, said actuator being disposed outside of said first and second rotary members and supported on a stationary portion of an associated device.

2. The control coupling according to claim 1 wherein said restriction means comprises restrictions provided to said ends of said discharge passages, respectively.

3. The control coupling according to claim 2 wherein said oil discharge means comprises a cam surface formed in said second rotary member, a plurality of pistons installed on said first rotary member in such a way as be movable radially of said first rotary member being driven by said cam surface and a plurality of pressure chambers variable in volume in response to movement of said pistons, said discharge passages being communicated with said pressure chambers.

4. A control coupling comprising:

a first rotary member;

a second rotary member rotatable relative to said first rotary member;

oil discharge means responsive to a rotational speed differential between said first and second rotary members for discharging a quantity of oil proportional to said rotational speed differential;

restriction means for restricting discharge of oil by said oil discharge means and thereby producing an oil pressure for urging one of said first and second rotary members against that other; and control means for controlling discharge of oil from said discharge means such that under a predetermined condition said discharge of oil from said discharge means is prevented thereby preventing substantial relative rotation of said first and second rotary members;

said control means including a spool chamber concentrically formed in said first rotary member and a spool movable in said spool chamber;

said oil discharge means including a plurality of discharge passages formed in said first rotary member and having ends directly connected to said spool chamber and equally spaced circumferentially along said first rotary member;

said spool being axially movable to open and close said ends of said discharge passages;

said discharge passages being grouped such that grouped two of said discharge passages have said ends opposed diametrically of said spool chamber and discharge oil of substantially the same pressure at any angle of said first rotary member relative to said second rotary member;

said spool having an outer periphery which cooperates with said ends of said discharge passages to constitute a variable orifice variable in opening depending upon variation of position of said spool relative to said first rotary member;

said control means having a rod disposed concentrically with said first rotary member and axially movable together with said spool relative to said first rotary member and an electric actuator for actuating said rod and said spool to move relative to said first rotary member, said actuator being installed inside of an associated transfer and supported on its stationary portion.

5. The control coupling according to claim 1 wherein said actuator comprises a solenoid installed on a transfer casing.

6. The control coupling according to claim 5 wherein said control means further comprises a drive mode selecting switch for selecting one of two drive modes and a solenoid drive circuit for selectively energizing and deenergizing said solenoid for thereby driving said spool into a first position where it completely closes said ends of said discharge passages and a second position where it cooperates with said ends of said discharge passages to define said orifice of a predetermined opening.

7. The control coupling according to claim 1, wherein said associated device is a transfer, and said actuator is disposed outside of said transfer.

* * * * *